(12) United States Patent
Johnsen et al.

(10) Patent No.: US 6,987,664 B2
(45) Date of Patent: Jan. 17, 2006

(54) FINGER GUARD FOR POWER DISTRIBUTION PANEL

(75) Inventors: David J. Johnsen, New Hope, MN (US); Carlos Cabrera, Ciudad Juarez (MX); David E. Schomaker, Lino Lakes, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/085,753

(22) Filed: Mar. 21, 2005

(65) Prior Publication Data

US 2005/0162818 A1    Jul. 28, 2005

Related U.S. Application Data

(63) Continuation of application No. 09/932,466, filed on Aug. 17, 2001, now Pat. No. 6,870,729.

(51) Int. Cl.
*H02B 1/04* (2006.01)

(52) U.S. Cl. .................. 361/631; 361/627; 361/628; 361/643; 200/50.03

(58) Field of Classification Search ............. 361/627, 361/628, 631, 632, 634–636, 641, 646, 647, 361/652, 656, 673; 200/50.01, 50.02, 50.03, 200/50.08, 293; 174/66, 67
See application file for complete search history.

(56) References Cited

U.S. PATENT DOCUMENTS

| | | | |
|---|---|---|---|
| 4,774,390 A | * | 9/1988 | Lehman et al. ............. 200/304 |
| 4,876,425 A | | 10/1989 | Woskow |
| 5,144,323 A | * | 9/1992 | Yonkers ..................... 342/386 |
| 5,744,768 A | | 4/1998 | Bishop et al. |
| 5,894,404 A | | 4/1999 | Vrnak et al. |
| 6,014,302 A | | 1/2000 | Batko et al. |
| 6,020,824 A | * | 2/2000 | Tamura et al. ........... 340/815.5 |

(Continued)

FOREIGN PATENT DOCUMENTS

JP      04165908      6/1992

OTHER PUBLICATIONS

Exhibit A Telect, Inc., High Current Power Distribution Alarm Panel Users Manual, Issue A, Rev 1, ©1999, front cover, inside front cover, pp. 7, 17, 33 and rear cover.

(Continued)

*Primary Examiner*—Boris Chervinsky
(74) *Attorney, Agent, or Firm*—Merchant & Gould P.C.

(57) ABSTRACT

A finger guard for an electrical circuit breaker includes a rear plate with an opening, a guard portion extending from the plate adjacent the opening, and a removable portion, or knock-out, positioned within the opening. A further finger guard for an electrical circuit breaker includes a rear plate with an opening, a guard portion extending from the plate adjacent the opening, and opposing ramped finger grips on the outer walls of the guard portion. A further finger guard for an electrical circuit breaker includes a rear plate with an opening, and a guard portion extending from the plate adjacent the opening, the plate further including a designation holder. An electrical power distribution system with a chassis having an electrical circuit including a mount for an electrical circuit breaker and an opening providing access to the mount, includes a finger guard mounted across the opening. A method of removing a finger guard from an opening on an electric power distribution chassis, removing a portion covering an opening in the finger guard, mounting the finger guard to an electrical circuit breaker, and inserting the electrical circuit breaker into a circuit breaker mount in an electrical circuit within the chassis.

8 Claims, 8 Drawing Sheets

U.S. PATENT DOCUMENTS 6,541,722 B1 * 4/2003 Whipple et al. ............ 200/293

OTHER PUBLICATIONS

Exhibit B Photograph of cover plates as shown in Telect, Inc., Catalog of Exhibit A.

Exhibit C Photograph of Carling Technologies fingerguard, undated.

Exhibit D Specification sheets for Telpower Compact Fused Disconnect Switch, dated Sep. 24, 2000, manufactured by Telect, Inc., and distributed by Cooper Bussmann.

Exhibit E "PowerWorx™ Traditional GMT Series Power Distribution Panel User Manual", *ADC Telecommunications, Inc.*, ADCP-80-520, Issue 1, pp. 1-33 (Dec. 1999).

Exhibit F "PowerWorx™ Power Distribution Products", *ADC Telecommunications, Inc.*, 6 pages (Aug. 2000).

Exhibit G "PowerWorx® Select Series™ Fuse Platform", *ADC Telecommunications, Inc.*, 8 pages (Aug. 2000).

Exhibit I "PowerWorx® SuperPower™ GMT Series", *ADC Telecommunications, Inc.*, 8 pages (Jan. 2001).

Exhibit J "PowerWorx® Traditional GMT Series", *ADC Telecommunications, Inc.*, 8 pages (Jan. 2001).

Exhibit K "PowerWorx® Uninterrupted Power GMT Series", *ADC Telecommunications, Inc.*, 8 pages (Jan. 2001).

Exhibit L Fingerguards mounted to circuit breakers in an ADC power distribution panel, 4 photographs.

Exhibit M Telect, Inc., power distribution panel, 17 photographs.

* cited by examiner

FINGER GUARD FOR POWER DISTRIBUTION PANEL

CROSS-REFERENCE TO RELATED APPLICATIONS

This application is a continuation of U.S. patent application Ser. No. 09/932,466, filed on Aug. 17, 2001, now issued as U.S. Pat. No. 6,870,729, on Mar. 22, 2005, the disclosure of which is incorporated herein by reference.

FIELD OF THE INVENTION

The present invention relates to power distribution units. More specifically, the present invention relates to providing finger guards for circuit breakers used with power distribution units.

BACKGROUND OF THE INVENTION

Power distribution units are used to distribute power supplied by a main electrical source to a variety of devices requiring power. The power distribution unit may include an internal power bus that powers one or more circuits. Each of these circuits may include a protective device, such as a fuse or a circuit breaker, which is accessible through one of the walls or panels of the unit. A power distribution unit may have the capacity for more circuits than are required when the unit is installed, which provides for future expansion. In such installations, one or more of the circuits may be left open, that is, without having any protective device.

The openings through which these omitted protective devices will extend are often covered to prevent unwanted or accidental contact with the power bus within the unit. This may be done with a flat plate or blank cover secured over the opening. When a protective device is inserted into the opening to provide an additional power circuit, this blank is then removed and discarded. A mounting plate may then be attached to the protective device and the device inserted into the power distribution unit. When a switched circuit breaker is the protective device installed, the mounting plate may incorporate a finger guard structure to protect the switch from accidental contact opening the circuit and interrupting power in the circuit.

Several concerns arise in the area of finger guards, including ease of use and reliability. Providing separate mounting plates and blank covers can be difficult to coordinate and manage, especially when the circuit protective devices are added later. Further developments in finger guards are desired.

SUMMARY OF THE INVENTION

The present invention relates to a finger guard for an electrical circuit breaker, the finger guard including a rear plate with an opening, a guard portion extending from the plate adjacent the opening, and a removable portion, or knock-out, positioned within the opening.

The present invention further relates to a finger guard for an electrical circuit breaker, the finger guard including a rear plate with an opening, a guard portion extending from the plate adjacent the opening, and opposing ramped finger grips on the outer walls of the guard portion.

The present invention also relates to a finger guard for an electrical circuit breaker, the finger guard including a rear plate with an opening, a guard portion extending from the plate adjacent the opening, and the plate further including a designation holder.

The present invention relates as well to an electrical power distribution system with a chassis having an electrical circuit including a mount for an electrical circuit breaker and an opening providing access to the mount, a finger guard mounted across the opening, the finger guard including an opening covered by a removable portion.

The present invention also relates to an electrical power distribution system with a chassis having an electrical circuit including a mount for an electrical circuit breaker and an opening providing access to the mount, a finger guard mounted across the opening, the finger guard including opposing ramped finger grips on the outer walls of the guard portion.

The present invention further relates to an electrical power distribution system with a chassis having an electrical circuit including a mount for an electrical circuit breaker and an opening providing access to the mount, a finger guard mounted across the opening, the finger guard including a designation holder.

The present invention relates as well to a method of removing a finger guard from an opening on an electric power distribution chassis, removing a portion covering an opening in the finger guard, mounting the finger guard to an electrical circuit breaker, and inserting the electrical circuit breaker into a circuit breaker mount in an electrical circuit within the chassis.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
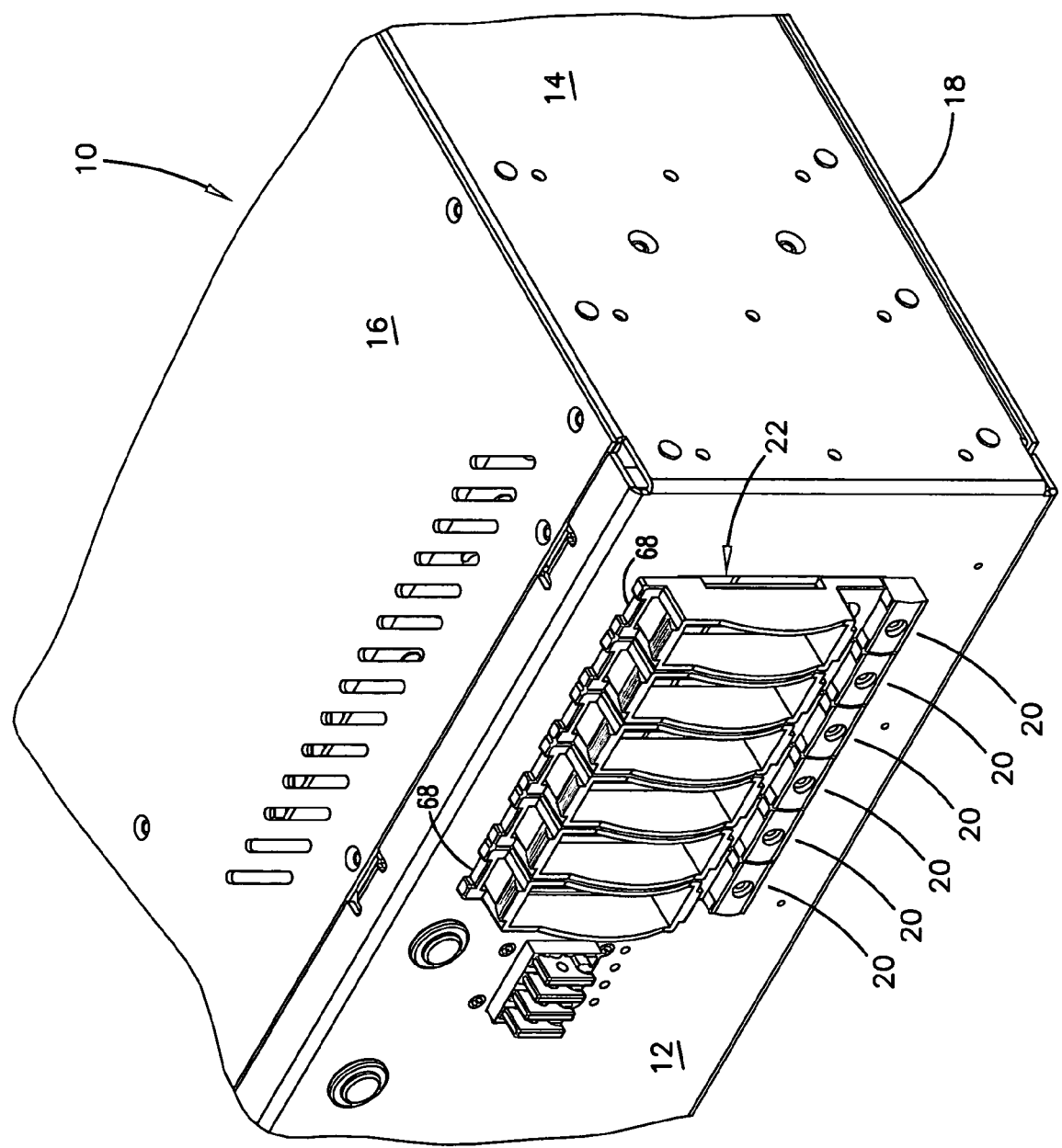
FIG. 1 is a front perspective view of a portion of a power distribution unit according to the present invention.
Figure 5:
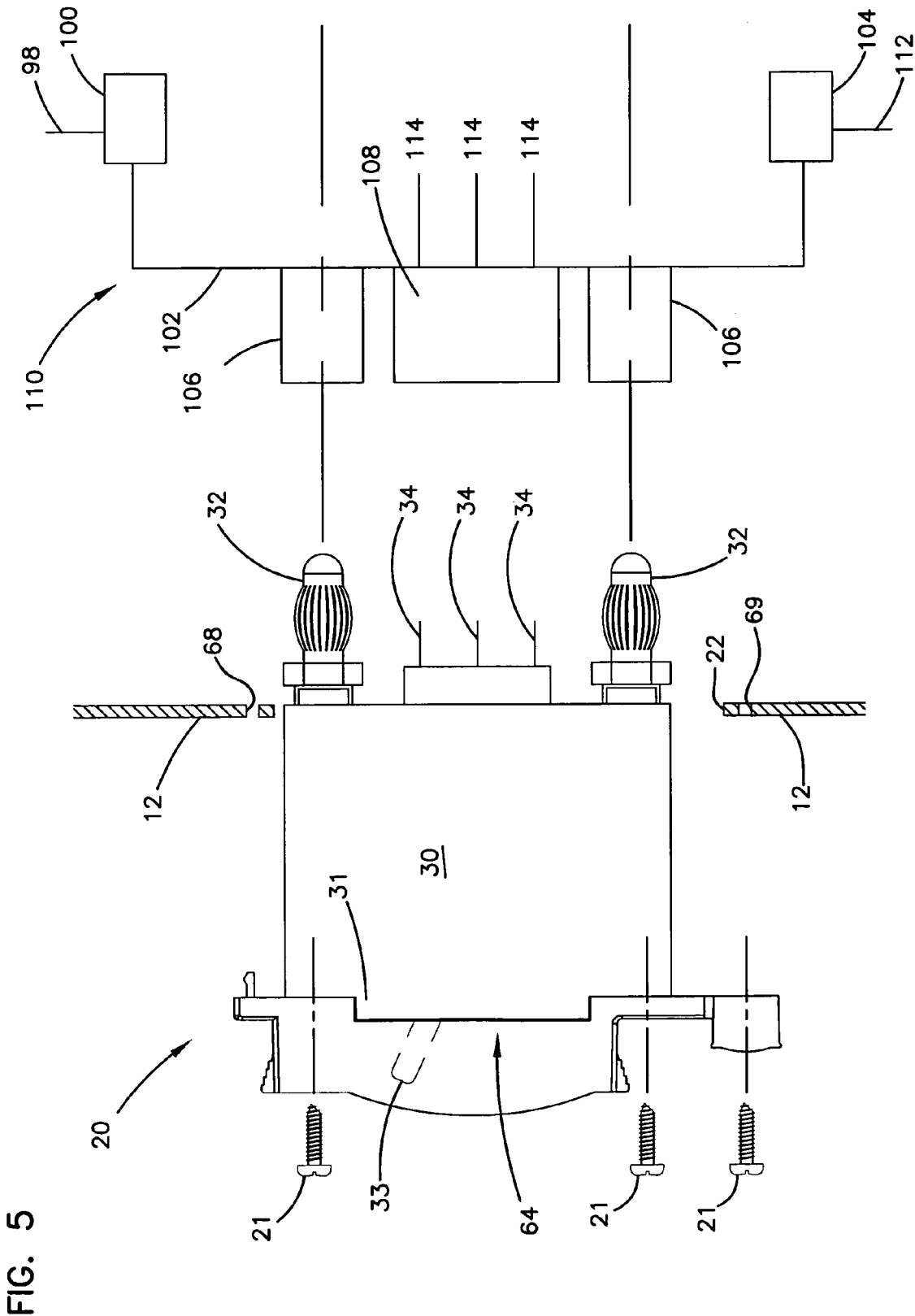
FIG. 5 is a side view of a finger guard according to the present invention mounted to a switchable circuit breaker and a schematic electrical circuit including a circuit breaker mount for the power distribution unit of FIG. 1.

FIG. 1 shows a portion of a power distribution panel 10 for use in a telecommunications installation, such as a rack, to provide power to other devices within the same installation. Panel 10 includes protective devices in the form of circuit breakers and fuses. Typically on the rear of panel 10 is a power input connection 98 where a power supply feed is connected. As shown in FIG. 5, an internal bus 100 distributes the current provided through power input connection 98 into a series of separate distribution circuits 102. Each distribution circuit 102 is electrically connected with a power output connection 112 by a lead 104. Power output connection 112 is also on the rear of panel 10, and provides power to a device mounted elsewhere in the telecommunications installation. Distribution circuits 102 require a protective device such as circuit breaker 30 be mounted in the distribution circuit to complete the electrical path and to provide over-current protection for the distribution circuit.

Referring now to FIGS. 1 through 4, power distribution panel 10 includes a front face 12, a side 14, a top 16 and a bottom 18, along with a rear face and an opposing side which are not shown, forming an enclosure for the power bus housed by panel 10. Finger guards 20 are mounted in an access opening 22 in front face 12. Behind each of six finger guards 20 are mounts 110 to mount the protective devices completing and providing over-current protection for each of six internal distribution circuits 102. Power distribution units may include more or less than the six circuits 102 shown. Also located on front face 12 are power indicator lamp 24 and electrical fuse array 26, providing additional over-current protection to electrical circuits within power distribution panel 10.

FIG. 5 shows finger guard 20 mounted to the front of a protective device, in this case a switched circuit breaker 30. Also shown is mount 110 of distribution circuit 102 for receiving such a protective device. A pair of mounting studs 32, located at the rear of circuit breaker 30, interface with the stud receivers 106 which are part of mount 110. Insertion of mounting studs 32 in stud receivers 106 and placing switch 33 of switched circuit breaker 30 into a closed position will complete the electrical path for each distribution circuit 102. Also located to the rear of circuit breaker 30, between mounting studs 32, are alarm leads 34. Alarm leads 34 are received by alarm interface 108 of mount 110 to provide a connection with alarm circuits 114 within power distribution panel 10. Alarm circuits 114 will initiate failure alarms when the current flowing through circuit breaker 30 is disrupted. Also shown in FIG. 5 are screws 21, which are discussed further below.

Figure 6:
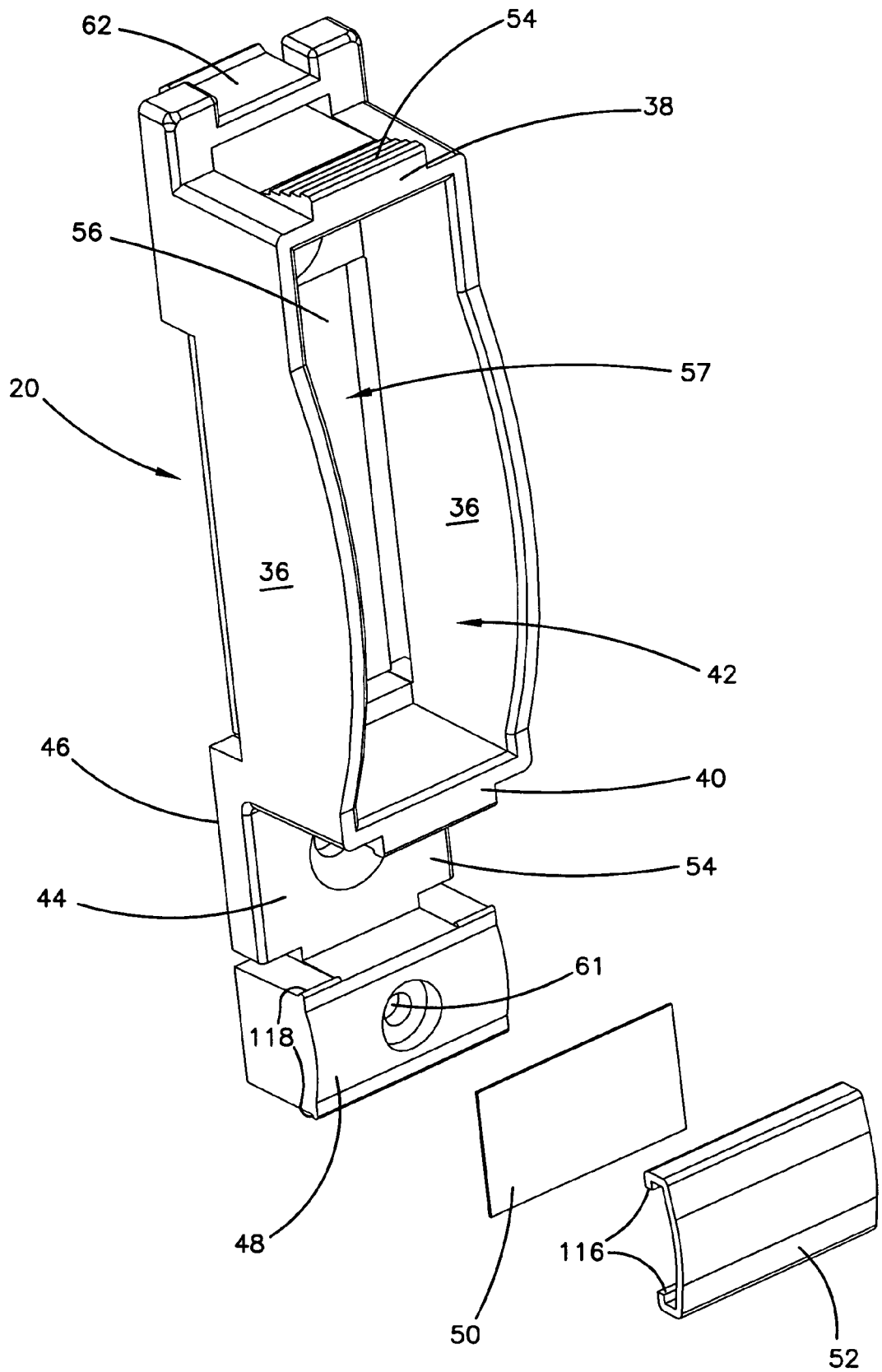
FIG. 6 is a front perspective view of a finger guard according to the present invention.
Figure 7:
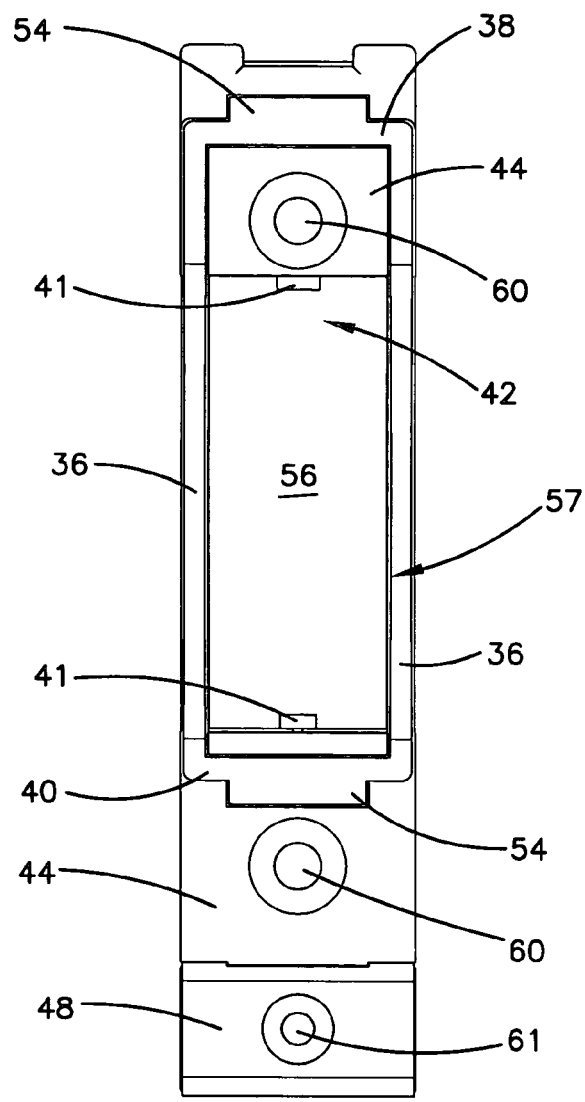
FIG. 7 is a front view of the finger guard of FIG. 6.
Figure 10:
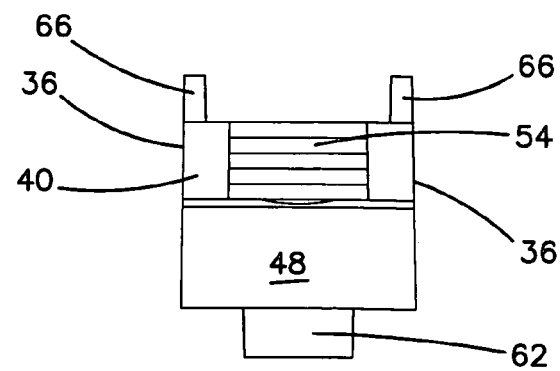
FIG. 10 is a bottom view of the finger guard of FIG. 6.

Referring now to FIG. 6, finger guard 20 includes a front face 44, a rear face 46, side guards 36, a top wall 38 and a bottom wall 40 cooperating to define an enclosure 42. A removable portion or knock-out 56 closes a portion of the rear of enclosure 42 while the front of enclosure 42 is open. A portion of the rear of the enclosure is opened by the removal of knock-out 56, forming an opening 57, through which a portion 31 of circuit breaker 30 extends, as shown in FIG. 5. Also extending from circuit breaker 30 through opening 57 into enclosure 42 is switch 33 for setting circuit breaker 30 into an open or closed position. The remainder of the rear of enclosure 42 is closed by front face 44 and rear face 46.

At the bottom of finger guard 20 is located an indicia holder 48 through which is formed opening 61. An indicia cover 52 removably mounts to the front of indicia holder 48. Cover 52 can include indicia or it can be transparent to visible light for trapping a designation card 50 to identify the circuit protected by circuit breaker 30. Cover 52 includes opposing edges 114 along the rear which engage lips 116 along the top and bottom of indicia holder 48 to securely and removably hold cover 52 to indicia holder 48.

Figure 8:
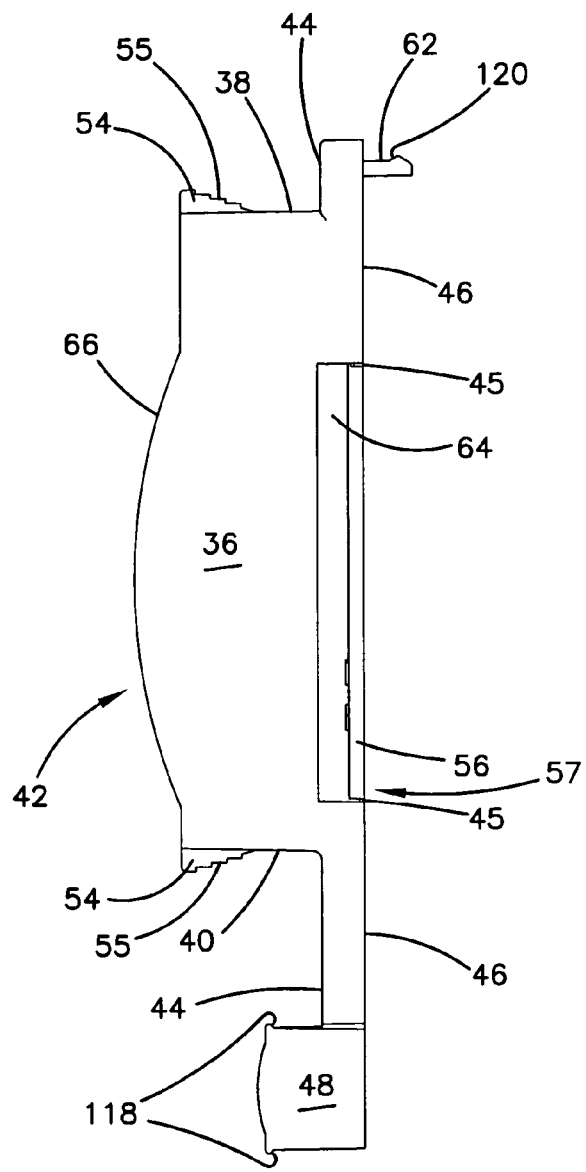
FIG. 8 is a side view of the finger guard of FIG. 6.
Figure 9:
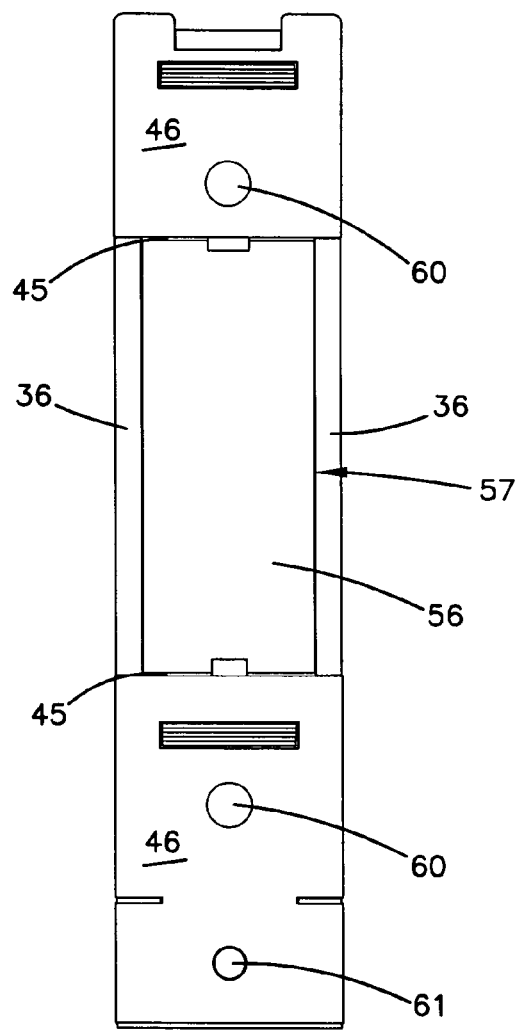
FIG. 9 is a rear view of the finger guard of FIG. 6.

Located on the distal ends of the outer surfaces of top wall 38 and bottom wall 40 are opposing ramped finger grips 54. Ramped finger grips 54 provide a positive and comfortable surface for grasping and removing circuit breaker 30 connected to mount 110 inside power distribution panel 10, when finger guard 20 is mounted to circuit breaker 30, as shown in FIG. 5. Ramped finger grips 54 may have ridges 55 formed in the ramped surface, as shown in FIG. 8, or may be have some alternative surface treatment to increase friction and improve grip.

Referring now FIGS. 7 through 10, mounting openings 60 extend from front face 44 to rear face 46 of finger guard 20. Mounting openings 60 receive removable fasteners such as screws 21 for securing finger guard 20 to circuit breaker 30. The upper mounting opening 60 is located within enclosure 42 above knock-out 56. Openings 60 may be located in other positions along finger guard 20.

Knock-out 56 is joined to finger guard 20 by perforations, webbing or thinned portions 45, such as along the top and bottom of opening 57. Knock-out 56 is removed from opening 57 by applying force to knock-out 56 from the rear sufficient to break thinned portions 45. Alternatively, notches 41 in knock-out 56 provide openings for the insertion of a flat-bladed tool such as a screwdriver from the front and apply force to the rear of knock-out 56 using the leverage of the screwdriver to break thinned portions 45. Finger guard 20 is made from molded plastic having appropriate physical properties to permit the connection between finger guard 20 and knock-out 56 to be broken along thinned portions 45 with the application of reasonable force without damaging the remainder of finger guard 20.

Along the rear of finger guard 20 is a rear notch 64 in side guards 36. Rear notch 64 is sized to receive portion 31 of circuit breaker 30 when finger guard 20 is mounted to circuit breaker 30. Not all circuit breakers include such an extension 31, having instead a flat front face. In addition, other protective devices may or may not have such an extension 31. Finger guard 20 is usable with such other protective devices, with or without an extension 31.

Side guards 36 include an arched portion 66 to provide additional protection to switch 33 of switched circuit breaker 30 extending into enclosure 42. Arched portion 66 is shown coextensive with opening 57 and rear notch 64. Side guards 36 may have alternative shapes, either curved or straight, provided that side guards 36 extend enough from front face 44 to provide the desired protection to the switch 33.

Figure 2:
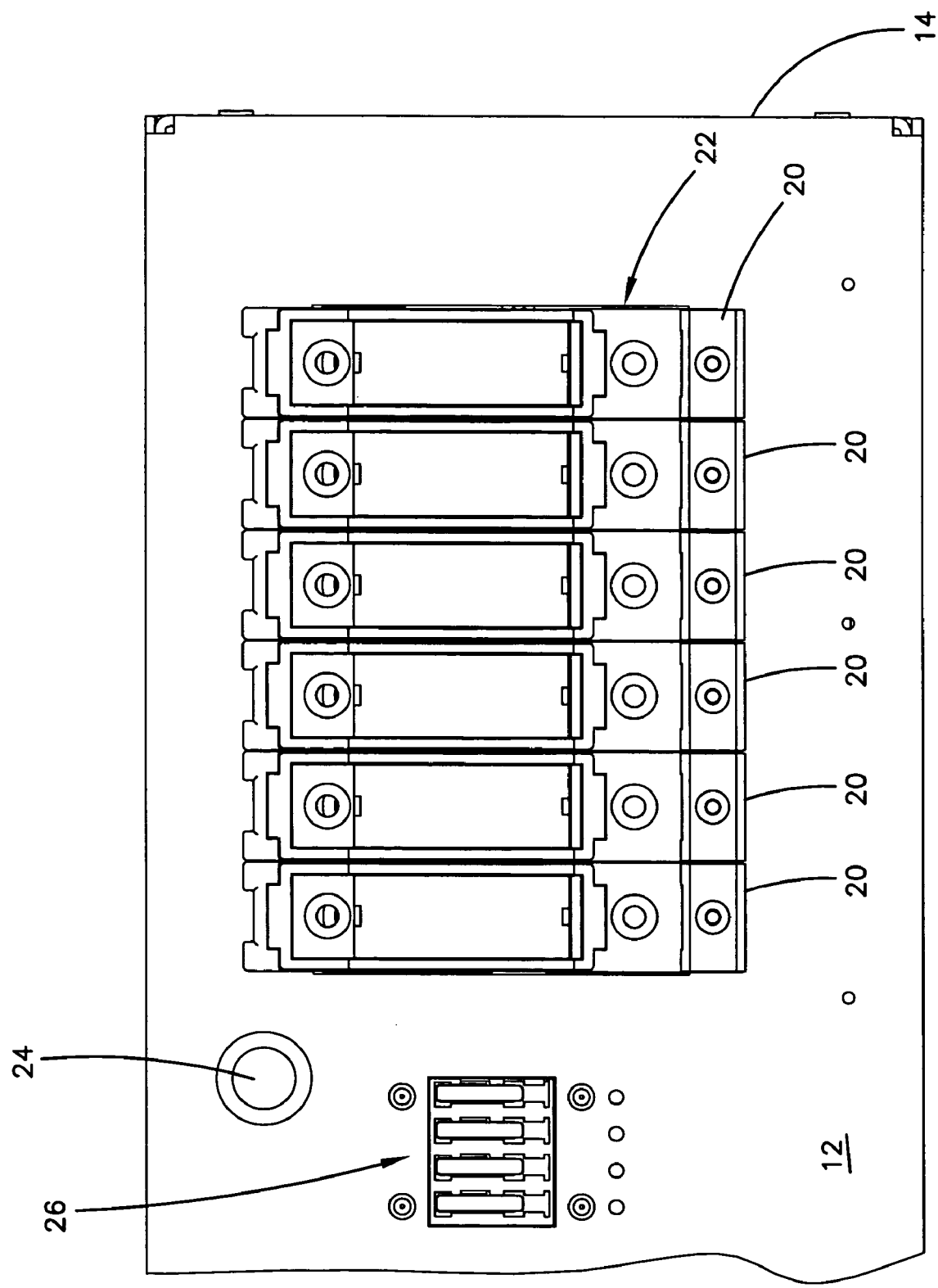
FIG. 2 is a front view of the power distribution unit of FIG. 1.
Figure 3:
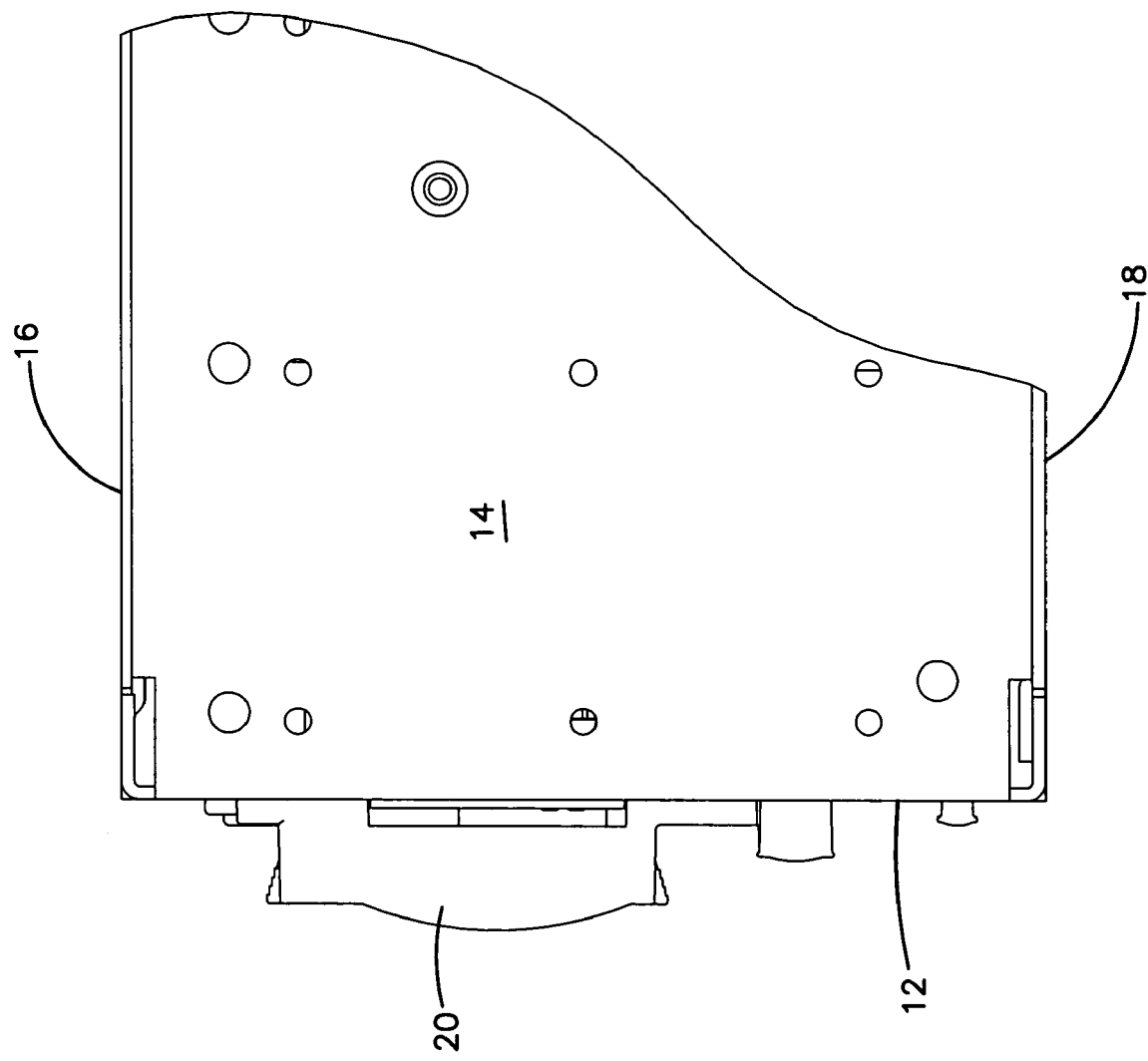
FIG. 3 is a side view of the power distribution unit of FIG. 1.
Figure 4:
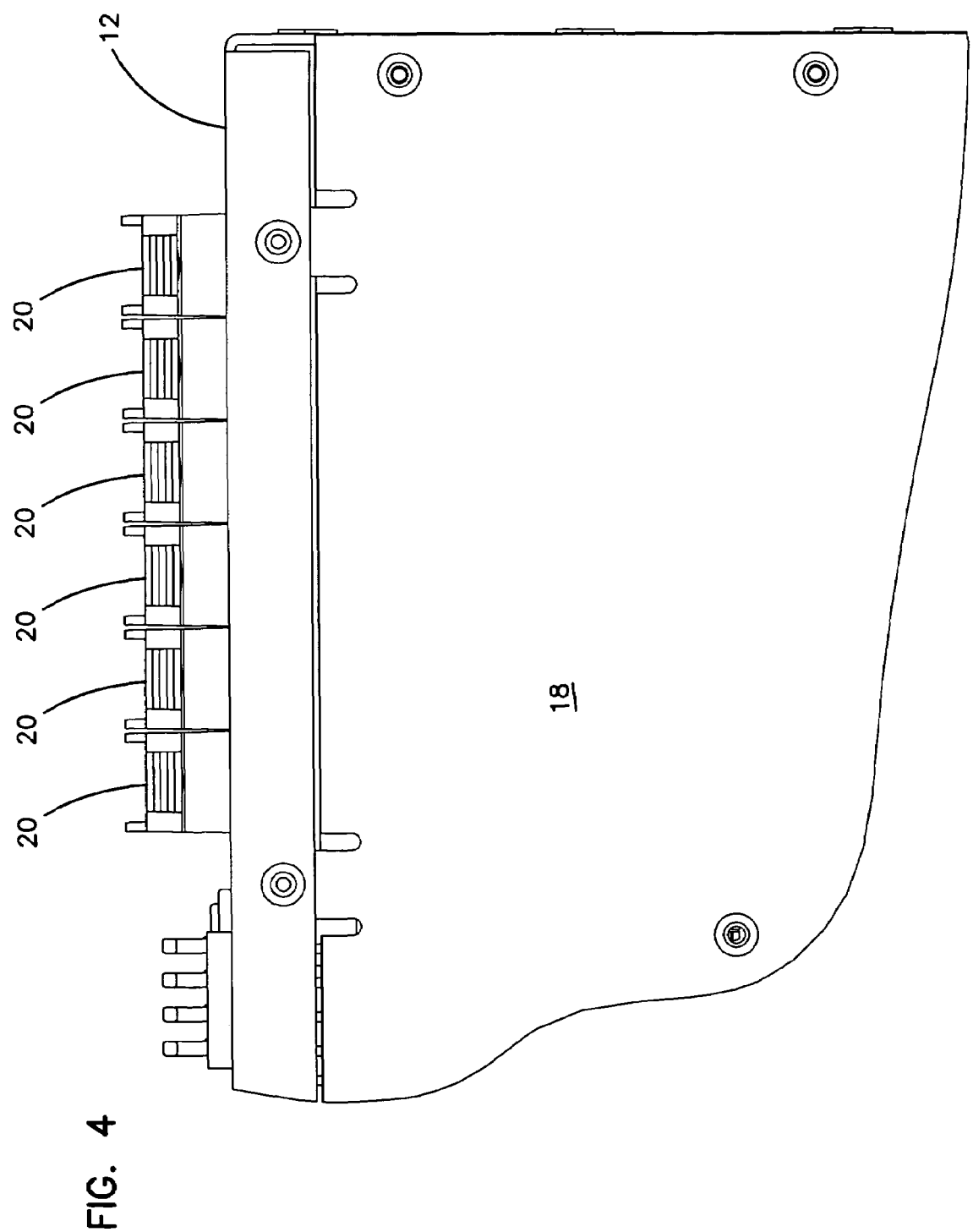
FIG. 4 is a bottom view of the power distribution unit of FIG. 1.

Power distribution panel 10 may include one or more internal distribution circuits 102 without a protective device such as circuit breaker 30 completing the electrical pathway between the power input terminal 98 and the power output terminal 112. In this case, opening 22 in front face 12 proximate the mounts 110 for the protective devices will be covered by a finger guard 20, as shown in FIG. 2. Finger guard 20 is held to front face 12 by a tab 62 inserted into a slot 68 through front face 12 above opening 22. Tab 62 includes a ramped portion 120 which extends through slot 68 and engages the rear of front face 12. Opening 61 through indicia holder 48 also accepts a removable fastener such as a screw 21 which engages an opening 69 through front face 12 below opening 22 to secure finger guard 20 to front face 12. Knock-out 56 covers opening 57 and cooperates with front face 44 of finger guard 20 when mounted to front face 12 of panel 10 to prevent accidental or unwanted contact with the electrical power components within panel 10.

To complete a distribution circuit, finger guard 20 is removed from front face 12 by removing the removable fastener such as screw 21 from opening 69 and opening 61, and withdrawing tab 62 from slot 68. Knock-out 56 is removed from opening 57 by exerting force on the rear of knock-out 56 and breaking thinned portions 45. Finger guard 20 in then placed on the front of a protective device such as circuit breaker 30 so that portion 31, if present, extends into rear notch 64 and switch 33 of circuit breaker 30 extends into enclosure 42. Removable fasteners such as screws 21 are then inserted through openings 60 to engage appropriate openings in circuit breaker 30 to mount finger guard 20 to circuit breaker 30. Circuit breaker 30 with finger guard 20 mounted to it is then inserted through opening 22 in front face 12 of panel 10 so that mounting studs 32 engage stud receivers 106 of mount 110 in distribution circuit 102 and alarm leads 34 are received by alarm interface 108. As the circuit breaker is fully inserted into the mount, tab 62 of finger guard 20 again engages an edge of slot 68 on front face 12 of panel 10 and rear face 46 of finger guard 20 rests against front face 12. A removable fastener such as screw 21 is then inserted through opening 61 to engage opening 69, securing finger guard 20 to front face 12.

With regard to the foregoing description, it is to be understood that changes may be made in detail, especially in matters of the construction materials employed and the shape, size and arrangement of the parts without the scope of the present invention. It is intended that the specification and depicted aspects be considered exemplary only, with a true scope and spirit of the invention being indicated by the broad meaning of the following claims.

What is claimed is as follows:

1. A finger guard for an electrical circuit protection device, the finger guard comprising:
   a body defining a protection device receiving region;
   a removable portion blocking receipt of the protection device in the protection device receiving region;
   a designation holder adjacent the protection device receiving region;
   means for directly mounting the protection device to the body when the removable portion is removed; and
   means for directly mounting the body to a chassis.

2. The finger guard of claim 1, wherein the means for directly mounting the protection device to the body when the removable portion is removed includes an opening for receiving a removable fastener for mounting the protection device to the body.

3. The finger guard of claim 1, wherein the means for directly mounting the body to the chassis includes an opening for receiving a removable fastener for mounting the body to the chassis.

4. The finger guard of claim 1, further comprising a raised guard positioned about the protection device receiving region, the raised guard including a pair of opposing finger grips, one of the finger grips on each of a top wall and a bottom wall of the raised guard.

5. The finger guard of claim 4, wherein the designation holder is positioned outside of the raised guard adjacent the top wall or the bottom wall of the raised guard.

6. An electrical power distribution system comprising:
   a chassis including at least one electrical circuit protective device mounting location;
   a face of the chassis including an opening through which an electrical circuit protection device may be inserted into the at least one mounting location;
   a guard mounted to the face blocking at least a portion of the opening of the face and preventing access to the at least one mounting location, the guard including:
   a body defining a protection device receiving region;
   a removable portion blocking receipt of the protection device in the protection device receiving region;
   a designation holder adjacent the protection device receiving region;
   means for directly mounting the protection device to the body when the removable portion is removed; and
   means for directly mounting the body to the face of the chassis.

7. The system of claim 6, the guard further comprising a switch guard adjacent the protection device receiving region.

8. A finger guard for an electrical circuit protection device, the finger guard comprising:
   a body defining a protection device receiving region;
   a removable portion blocking receipt of the protection device in the protection device receiving region;
   a designation holder adjacent the protection device receiving region;
   a first opening for receiving a removable fastener for directly mounting the protection device to the body when the removable portion is removed; and
   a second opening for receiving a removable fastener for directly mounting the body to a chassis.

* * * * *